(12) United States Patent
Porubanova et al.

(10) Patent No.: US 12,413,696 B2
(45) Date of Patent: Sep. 9, 2025

(54) TECHNIQUES FOR CORRECTING VERTICAL ANGULAR IMAGE MISALIGNMENT IN EXTENDED REALITY SYSTEMS

(71) Applicant: Microsoft Technology Licensing, LLC, Redmond, WA (US)

(72) Inventors: Michaela Porubanova, Seattle, WA (US); Gregory Michael Link, Charlotte, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 18/210,577

(22) Filed: Jun. 15, 2023

(65) Prior Publication Data

US 2024/0422301 A1 Dec. 19, 2024

(51) Int. Cl.
| | |
|---|---|
| *H04N 13/167* | (2018.01) |
| *G06T 5/20* | (2006.01) |
| *G06T 5/70* | (2024.01) |
| *G06T 7/13* | (2017.01) |
| *G06T 7/30* | (2017.01) |
| *H04N 13/327* | (2018.01) |

(52) U.S. Cl.
CPC ............ *H04N 13/167* (2018.05); *G06T 5/20* (2013.01); *G06T 5/70* (2024.01); *G06T 7/13* (2017.01); *G06T 7/30* (2017.01); *G06T 2207/10012* (2013.01); *G06T 2207/20056* (2013.01); *H04N 13/327* (2018.05)

(58) Field of Classification Search
CPC .... G06T 3/14; G06T 3/20; G06T 7/20; G06T 7/30
See application file for complete search history.

(56) References Cited

U.S. PATENT DOCUMENTS

| | | | |
|---|---|---|---|
| 10,820,795 B1 | 11/2020 | Weise | |
| 12,154,247 B1 | 11/2024 | Porubanova | |
| 2008/0084472 A1 | 4/2008 | Trudeau et al. | |
| 2013/0208976 A1* | 8/2013 | Cook | ........................ G06T 3/00 |
| | | | 382/254 |
| 2014/0145914 A1 | 5/2014 | Latta | |
| 2014/0333665 A1 | 11/2014 | Sylvan et al. | |
| 2016/0232715 A1 | 8/2016 | Lee | |
| 2016/0349510 A1 | 12/2016 | Miller | |

(Continued)

OTHER PUBLICATIONS

Non-Final Office Action mailed on Jan. 19, 2024, in U.S. Appl. No. 18/210,576, 10 pages.

(Continued)

*Primary Examiner* — Jessica M Prince
(74) *Attorney, Agent, or Firm* — Workman Nydegger

(57) ABSTRACT

Techniques for correcting a vertical angular image misalignment in stereoscopic images generated by an extended reality (ER) system are disclosed. A hologram is identified. This hologram is displayed in a scene of the ER system. A spatial frequency of the hologram is determined. A determination is made that the spatial frequency exceeds a spatial frequency threshold. The spatial frequency of the hologram is reduced until the spatial frequency is below the spatial frequency threshold. Such an operation results in a compensation being performed for a vertical angular image misalignment that exists between the stereoscopic images.

20 Claims, 17 Drawing Sheets

(56) References Cited

U.S. PATENT DOCUMENTS

| | | |
|---|---|---|
| 2016/0349837 A1 | 12/2016 | Miller |
| 2017/0309071 A1 | 10/2017 | Benko et al. |
| 2018/0053284 A1 | 2/2018 | Rodriguez et al. |
| 2018/0167607 A1* | 6/2018 | Okamoto ............... H04N 5/64 |
| 2019/0238818 A1 | 8/2019 | Held |
| 2019/0295323 A1 | 9/2019 | Gutierrez et al. |
| 2021/0160440 A1 | 5/2021 | Bleyer et al. |
| 2021/0160441 A1 | 5/2021 | Bleyer |
| 2021/0377505 A1* | 12/2021 | Liu .................. H04N 13/246 |
| 2023/0245603 A1* | 8/2023 | Bavor, Jr. ............. G09G 3/001 345/8 |
| 2024/0312145 A1 | 9/2024 | Hol |
| 2024/0378820 A1 | 11/2024 | Xiong |
| 2024/0420277 A1 | 12/2024 | Porubanova |
| 2024/0420278 A1 | 12/2024 | Porubanova |

OTHER PUBLICATIONS

International Search Report and Written Opinion received for PCT Application No. PCT/US2024/033186, Sep. 12, 2024, 15 pages.
Non-Final Office Action mailed on Dec. 19, 2024, in U.S. Appl. No. 18/210,572, 32 Pages.
Non-Final Office Action mailed on Dec. 19, 2024, in U.S. Appl. No. 18/651,406, 12 Pages.
International Search Report and Written Opinion received for PCT Application No. PCT/US2024/034227, Aug. 30, 2024, 14 pages.
International Search Report and Written Opinion Received in PCT Application No. PCT/US2024/039900, mailed on Dec. 2, 2024, 19 pages.
Notice of Allowance mailed on Apr. 5, 2024, in U.S. Appl. No. 18/210,578, 9 pages.
Notice of Allowance mailed on May 9, 2024, in U.S. Appl. No. 18/210,576, 7 pages.
Office Action mailed on Jun. 9, 2025, in U.S. Appl. No. 18/651,406, 19 pages.
U.S. Appl. No. 18/210,572, filed Jun. 15, 2023.
U.S. Appl. No. 18/210,576, filed Jun. 15, 2023.
U.S. Appl. No. 18/210,578, filed Jun. 15, 2023.
U.S. Appl. No. 18/651,406, filed Apr. 30, 2024.
U.S. Appl. No. 18/773,182, filed Jul. 15, 2024.
Notice of Allowance mailed on May 27, 2025, in U.S. Appl. No. 18/210,572, 12 pages.

* cited by examiner

TECHNIQUES FOR CORRECTING VERTICAL ANGULAR IMAGE MISALIGNMENT IN EXTENDED REALITY SYSTEMS

BACKGROUND

The phrase "extended reality" (ER) is an umbrella term that collectively describes various different types of immersive platforms. Such immersive platforms include virtual reality (VR) platforms, mixed reality (MR) platforms, and augmented reality (AR) platforms.

For reference, conventional VR systems create immersive experiences by restricting users' views to only virtual environments. This is often achieved through the use of a head-mounted device (HMD) that completely blocks any view of the real world. With this HMD, a user can be entirely or partially immersed within an immersive environment. Conventional AR systems create an augmented reality experience by visually presenting virtual objects that are placed in the real world. Conventional MR systems also create an augmented reality experience by visually presenting virtual objects that are placed in the real world. In the context of an MR system, those virtual objects are typically able to be interacted with by the user, and those virtual objects can interact with real-world objects. AR and MR platforms can also be implemented using an HMD.

Unless stated otherwise, the descriptions herein apply equally to all types of ER systems, including MR systems, VR systems, AR systems, and/or any similar system capable of displaying virtual content. An ER system can be used to display various types of information to a user. Some of that information is displayed in the form of a "hologram." As used herein, the term "hologram" generally refers to virtual image content that is displayed by an ER system. In some instances, the hologram can have the appearance of being a three-dimensional (3D) object while in other instances the hologram can have the appearance of being a two-dimensional (2D) object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real world. Other holograms can be locked to a particular position in the user's field of view (FOV). In any event, ER systems are able to generate numerous different types of holograms.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for correcting a vertical angular image misalignment in stereoscopic images generated by an extended reality (ER) system, said method including: detecting and calculating the vertical angular image misalignment between the stereoscopic images generated by the ER system; identifying a region of the stereoscopic images; determining a spatial frequency of the region; determining that the spatial frequency exceeds a spatial frequency threshold; and triggering execution of a correction algorithm that operates to reduce the spatial frequency of the region until the spatial frequency is below the spatial frequency threshold, resulting in a compensation for the vertical angular image misalignment, such as by making the displayed information more tolerable for a human's visual system.

In some aspects, the techniques described herein relate to an extended reality (ER) system that corrects a vertical angular image misalignment in stereoscopic images generated by the ER system, said ER system including: a processor system; and a storage system that stores instructions that are executable by the processor system to cause the ER system to: detect the vertical angular image misalignment between the stereoscopic images generated by the ER system; identify a plurality of holograms included in the stereoscopic images; determine spatial frequencies for the plurality of holograms; select, from among the plurality of holograms, a particular hologram having a highest spatial frequency as compared to spatial frequencies of the other holograms in the plurality of holograms; determine that the spatial frequency of the particular hologram exceeds a spatial frequency threshold; and execute a correction algorithm that operates to reduce the spatial frequency of the particular hologram until the spatial frequency is below the spatial frequency threshold, resulting in a compensation for the vertical angular image misalignment.

In some aspects, the techniques described herein relate to a method for correcting a vertical angular image misalignment in stereoscopic images generated by an extended reality (ER) system, said method including: identifying a hologram displayed in a scene of the ER system; determining a spatial frequency of the hologram; determining that the spatial frequency exceeds a spatial frequency threshold; and reducing the spatial frequency of the hologram until the spatial frequency is below the spatial frequency threshold, resulting in a compensation being performed for a vertical angular image misalignment that exists between the stereoscopic images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
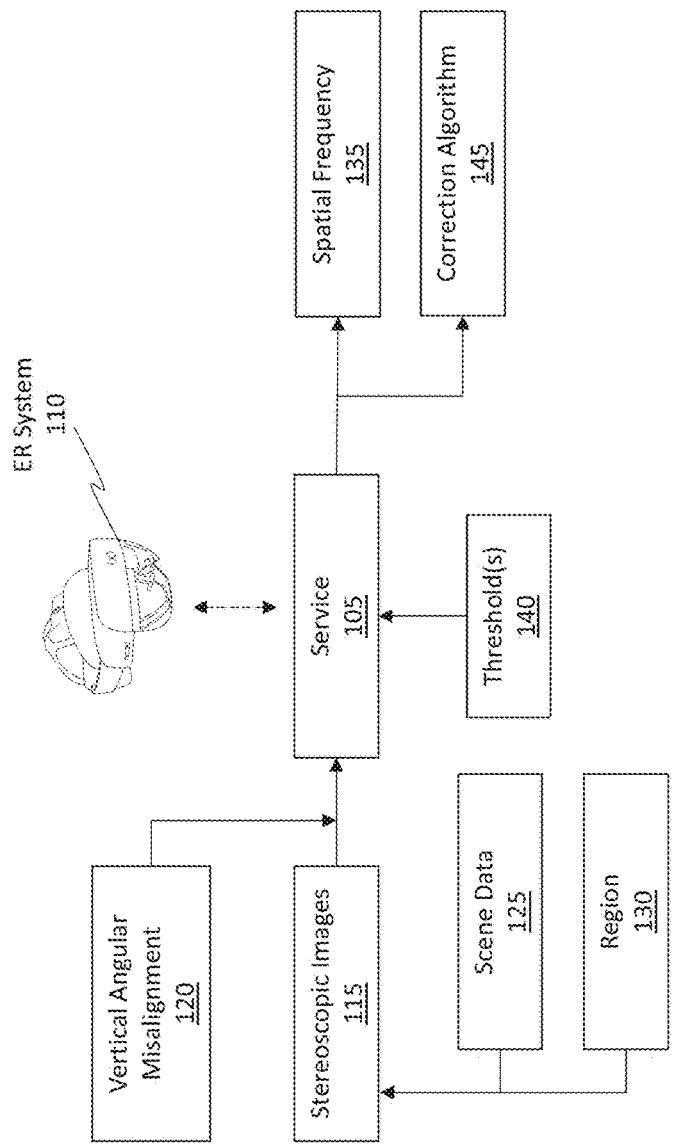
FIG. 1 illustrates an example architecture for correcting a vertical angular image misalignment in an ER system.

Display misalignment is one of the most pernicious issues in ER displays because it compromises the user's visual comfort and visual performance. In addition to discomfort, this misalignment often results in hologram misplacement in the visual field. Thus, correcting binocular display misalignment is desirable to build comfortable and quality ER experiences.

Some ER devices/systems are able to correct binocular display misalignments while operating in the field using various sensors. Generally, the sensors can detect the amount of misalignment that may occur by detecting bending or flexing movements of the ER system's display. If the HMD becomes slightly bent, then the HMD's displays will have an offset relative to each other and relative to the user's face, thereby resulting in a display misalignment. The ER system can use its sensors to then determine what amount of compensation or correction to perform.

Different types of misalignments can have different ramifications for the user. For instance, horizontal misalignment (aka horizontal image misalignment) refers to a scenario where the pixels of the displayed images are not rendered at the correct locations with respect to the user's pupils, thereby leading to various perceived depth errors on the part of the user. These depth errors can be quite problematic when the user is performing precision or accuracy-based tasks.

Vertical angular misalignment (aka vertical angular image misalignment) refers to a scenario where the optical axes of the displays are not parallel but rather have a vertical, angular offset relative to one another. Vertical angular misalignments may occur due to flexing or bending of the HMD or for positional shifts to the HMD's hardware. Vertical angular misalignments often result in visual strain, visual discomfort, motion sickness, or, in extreme cases, the inability of a user's mind to fuse those images, leading to a lack of immersion because of the disruption in the three-dimensional (3D) experience. A human's visual system is very sensitive to vertical disparity (e.g., vertical angular misalignment). The amount of disparity that can result in unnatural vergence movements is also very small. The phrase "binocular image misalignment" is an umbrella term that describes both horizontal image misalignments and vertical angular image misalignments.

Images may become misaligned for various reasons. For example, temporary or permanent physical and/or thermal deformations of the HMD's display may occur. As another example, inaccurate render camera positioning may also occur.

For these reasons, correcting binocular image misalignments is paramount to improving user comfort and to providing a quality experience. Although wearables are optimally aligned when they leave the factory, misalignment can be introduced during use because of the above-mentioned reasons. ER systems that have dedicated sensors are able to correct for these various binocular display misalignments; however, not all ER systems have such dedicated types of sensors.

Vertical fusional amplitudes (VFA) refer to the magnitude of this binocular vertical angular offset beyond which fusion of those images is not attainable. VFA is contingent on the spatial frequency of the to-be-fused stimulus (i.e. hologram), with an inverse relationship between vertical fusional abilities and stimulus spatial frequency. When an observer is looking at a stimulus of high spatial frequency, the stimulus is less likely to be fused, leading to significant eye strain and potentially diplopia, which interrupts the immersive 3D experience. As used herein, the term "stimulus" can be used to refer to any hologram or virtualized content.

The disclosed embodiments provide numerous benefits, advantages, and practical applications to the technical field of hologram display. For instance, because of the coupling of spatial frequency and vertical fusional range, the disclosed embodiments beneficially provide a vertical display-misalignment correction method that takes into account the spatial frequency of the stimulus. The spatial frequency of the stimulus can be estimated by analyzing the pixel grid and by estimating the spatial frequency, with one possible unit for the measurement being in cycles per degree (cpd). The disclosed techniques utilize this spatial frequency information of a 3D stimulus at which the user is looking in order to determine when to correct for binocular image misalignments, particularly for vertical angular misalignments.

As such, the lower the spatial frequency, the larger the vertical fusional range of the user, and therefore the less likely the correction leads to double vision. Similarly, if the spatial frequency is high and a correction cannot occur (for instance, in order not to interrupt the user experience), a blurring of the stimulus can be applied in order to increase the user's ability to fuse the content. Consequently, when the user is fixating on an object that has a very high spatial frequency (or rather, a spatial frequency that exceeds a threshold), a fast correction can be applied to prevent interruption of the user experience through diplopia and discomfort.

In some cases, a scene may include stimuli of varying spatial frequencies. Because this coupling applies to the stimulus of the highest spatial frequency, the correction is beneficially based on the detection of the highest spatial frequency in the virtual scene. As a result, the correction can be driven by the highest spatial frequency detected in the visual scene.

Also, because the ability to fuse vertically offset images is contingent on where a person is verging (vergence lock), one can selectively prioritize correcting larger amounts of vertical image misalignments based on the amount of real-world visibility. For example, when the real world is fully visible (such as in a scenario involving an AR or MR device) with no dimming of the real world, the user will be verging not only on the virtual content but also on the real world. In this case, the human visual system will be very sensitive to small vertical misalignments, and the experience will lead to diplopic imagery if not corrected. Thus, correcting even small amounts of misalignment when the real world is fully visible is paramount to quality and comfortable user experience.

On the other hand, when the real world is not visible, in the case of VR (by its very nature) or AR/MR with dimmed real-world backgrounds, the ability of the visual system to fuse vertically offset images is more flexible, as the user is verging on a content locked to the virtual display. As such, the correction of small misalignments that would normally result in diplopia if the real world were fully visible, is not necessary and might be counter-productive to the user experience since corrections can be observed and disruptive. Thus, the application of the vertical misalignment correction based on the vertical fusional thresholds can be performed with regard to real-world visibility and/or with regard to the spatial frequency of a stimulus. Accordingly, these and numerous other benefits will now be described in more detail throughout the remaining portions of this disclosure.

Example Architecture

Attention will now be directed to FIG. 1, which illustrates an example computing architecture 100. Architecture 100 includes a service 105, which can be implemented by an ER system 110 comprising an HMD. As used herein, the phrases ER system and HMD can be used interchangeably and generally refer to a type of system that displays holographic content (i.e. holograms). In some cases, ER system 110 is of a type that allows a user to see various portions of the real world and that also displays virtualized content in the form of holograms. That ability means ER system 110 is able to provide so-called "passthrough images" to the user. It is typically the case that architecture 100 is implemented on an MR or AR system, though it can also be implemented in a VR system.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables the service to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud environment. In some implementations, service 105 is a local service operating on a local device, such as the ER system 110. In some implementations, service 105 is a hybrid service that includes a cloud component operating in the cloud and a local component operating on a local device. These two components can communicate with one another.

Figure 2:
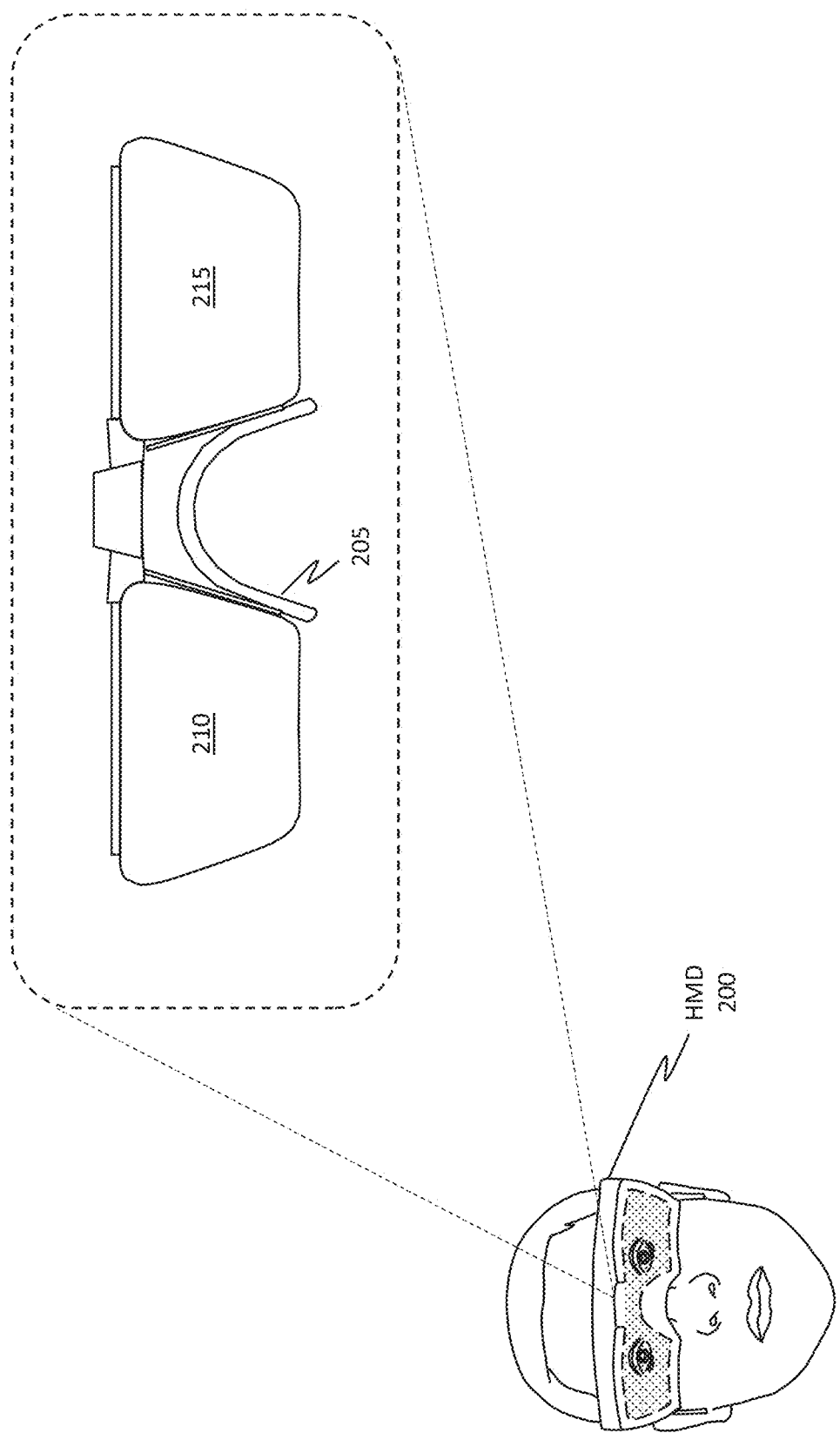
FIG. 2 illustrates an example of an ER system.

Turning briefly to FIG. 2, an HMD 200 is shown, where HMD 200 is representative of the ER system 110 of FIG. 1. HMD 200 includes a nose bridge 205, a left display 210, and a right display 215. HMD 200 is thus configured to provide binocular vision to the user. That is, HMD 200 displays a first image in the left display 210 and a second, different image in the right display 215. The user will view these two separate images, and the user's mind can fuse them, thereby allowing the user to perceive depth with respect to the holograms.

Returning to FIG. 1, service 105 is generally tasked with correcting a vertical angular misalignment in stereoscopic images generated by the ER system 110. For instance, FIG. 1 shows how service 105 is able to access stereoscopic images 115 (e.g., a left image for the lefthand display and a right image for the righthand display). There is a vertical angular misalignment 120 that exists between these images. It is desirable to correct or compensate for this vertical angular misalignment 120.

To do so, service 105 accesses scene data 125 about the scene in which the ER system 110 is operating. This scene data 125 may include any information about the real world as well as any information about holograms that are being displayed by ER system 110. More generally, scene data 125 includes information about various regions (e.g., region 130) that are included in the scene. Typically, reference to a "region," as used herein, refers to holographic content that is displayed in the scene.

Figure 3:
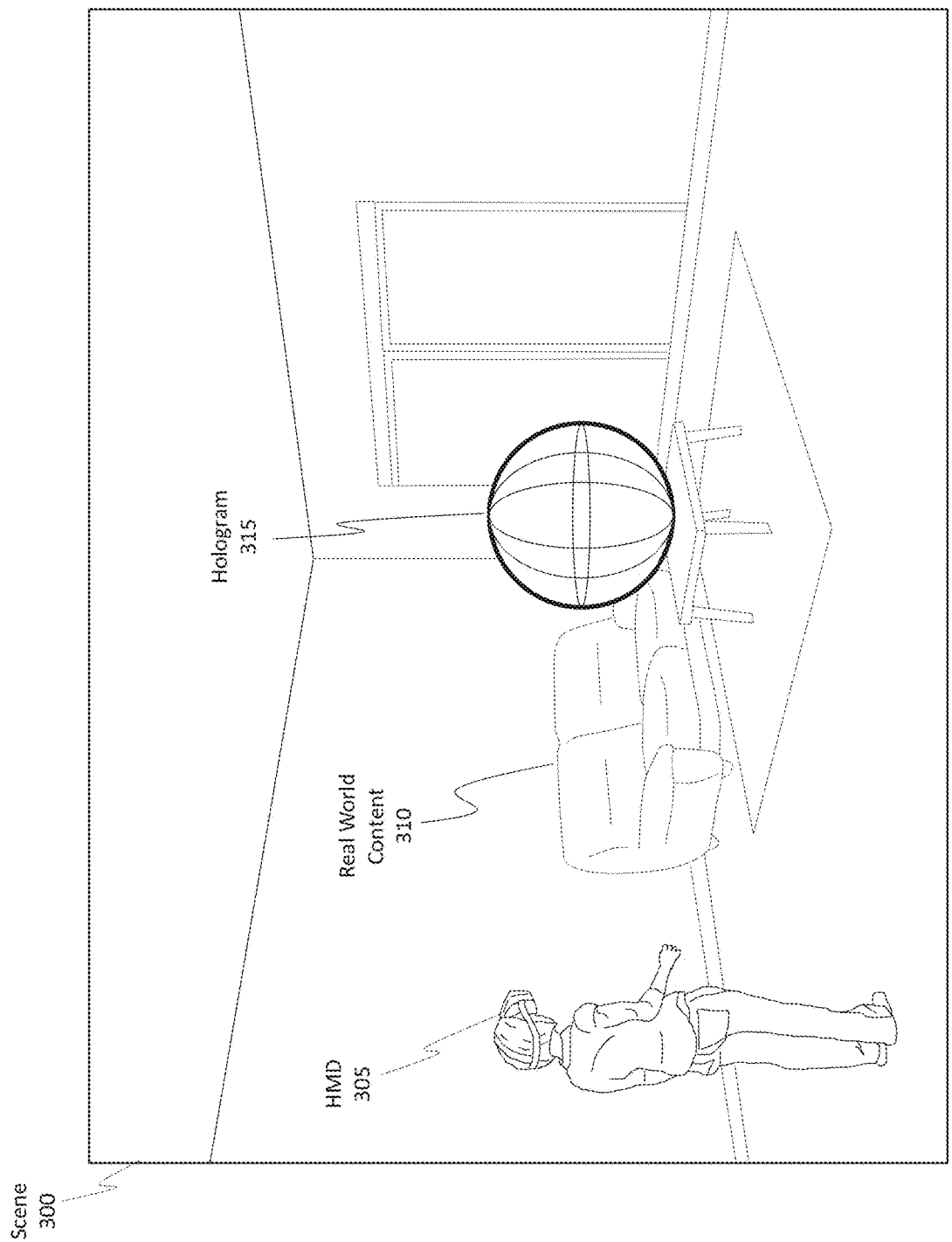
FIG. 3 illustrates an example scene in which the ER system is operating.

Turning briefly to FIG. 3, a scene 300 is shown. Scene data 125 from FIG. 1 can be data describing scene 300. FIG. 3 also shows a user wearing an HMD 305, which is representative of any of the ER systems or HMDs mentioned thus far. In this particular scenario, HMD 305 is an example of an AR or MR system, though in other scenarios a VR system could be used.

Scene 300 includes various different real-world content 310. Scene 300 also includes one or more holograms, such as hologram 315. Thus, hologram 315 exists simultaneously with real-world content 310.

Figure 4:
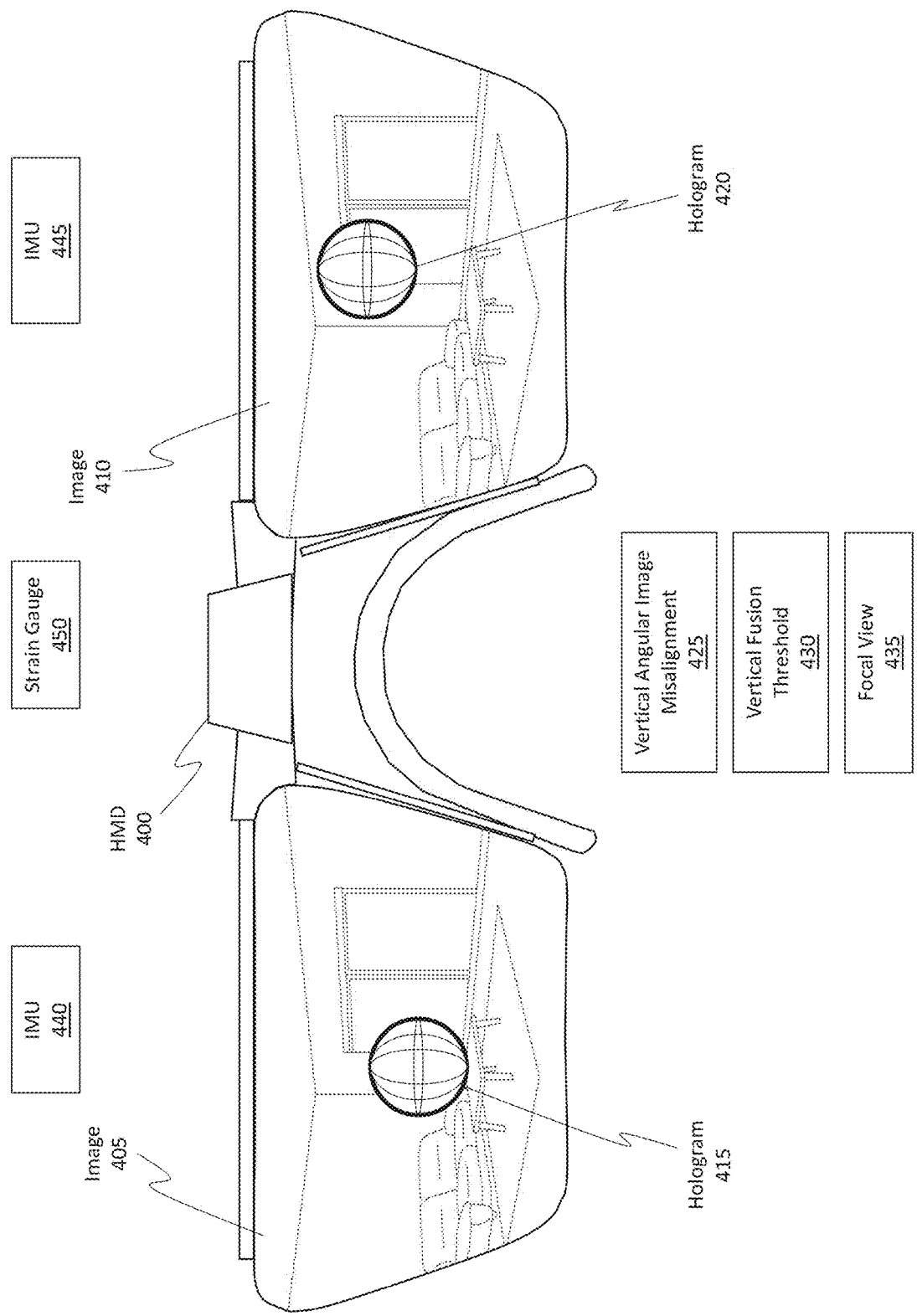
FIG. 4 illustrates an example of a vertical angular image misalignment.

As mentioned previously, it is often the case that ER systems suffer from vertical angular image misalignment with respect to the stereoscopic images that they generate. FIG. 4 is illustrative.

FIG. 4 shows an HMD 400 that is currently displaying a first image 405 and a second image 410. Image 405 includes a hologram 415, and image 410 includes a hologram 420. Hologram 420 corresponds to hologram 415.

Notice, the placement or location of hologram 420 in image 410 has a vertical angular offset relative to the placement of hologram 415 in image 405 (e.g., hologram 420 is not immediately over the top of the table whereas hologram 415 is). This offset is what is referred to as the vertical angular image misalignment 425.

The human mind can fuse images when a small amount of vertical angular offset is present, but if that offset exceeds a so-called vertical fusion threshold 430, then the human mind cannot fuse the images, and the human will experience discomfort when viewing the images. That vertical fusion threshold 430 is approximately 0.3 milli-radians. Thus, if the vertical angular offset between images 405 and 410 is about 0.3 milli-radians or more, then the user wearing HMD 400 will not be able to fuse images 405 and 410, and the user will experience discomfort. It should also be noted how the holograms 415 and 420 are currently in the focal view 435 (i.e. the center of focus) of the user.

Different techniques can be employed to measure or detect the presence or occurrence of vertical angular image misalignment 425. As one example, HMD 400 can be equipped with various different inertial measurement units (IMUs). For instance, an IMU 440 can be disposed proximately to the lefthand display, and another IMU 445 can be disposed proximately to the righthand display. These IMUs are able to detect various different vectors, including the gravity vector. When a vertical angular offset occurs between the left and right displays, the vector information from the IMUs can be used to determine the amount of offset by comparing how different those vectors are relative to one another. Stated differently, an HMD can be equipped with multiple IMUs, such as one per display on the HMD. Each IMU is tightly coupled to its associated display. By integrating the IMU's concept of "down" over time (e.g., the gravity vector), each IMU can learn a common orientation, and the angular disparity between the IMUs can then be presumed to be the same as the display disparity (because the IMUs are tightly coupled to the displays).

As another example for detecting vertical angular offset, HMD 400 can be equipped with a strain gauge (aka bend sensor), which is a sensor that measures distortions in an object. To illustrate, strain gauge 450 determines a deviation between one of its sides and the other of its sides, thereby providing information about where one HMD display is relative to some other object (e.g., the HMD's frame), while the other would correlate the frame to the other display. Therefore, one implementation includes a strain gauge across the nose of the device, separating two "halves" of the HMD's frame, so that any bend around the nose can be detected. By making that nose region less structurally rigid than the rest of the frame, it increases the likelihood that any deformation or bend occurs in the sensed region and can therefore be detected and subsequently accommodated. Accordingly, the data from the strain gauge can be used to determine the amount of vertical angular offset that exists between the displays.

As another example, a first camera can be directed toward the lefthand display and the image produced by that display. A second camera can be directed toward the righthand display and the image produced by that display. The first and second cameras are in a known offset reference frame from each other. Disparities between the resulting camera images can be identified, and those disparities can be used to determine the amount of vertical angular offset. Similarly, a single observer camera can be used, where this single observer camera is able to observe both of the HMD's displays at once. The resulting image can be analyzed to determine the correlation between those images to then determine the vertical angular offset.

As yet another example, various models can be generated and used to estimate the vertical angular offset. These models may employ machine learning and can use data from a large number of other HMDs over time. The models can generally estimate how much vertical angular offset an HMD is likely to have over time. Thus, the embodiments can determine the age of the current HMD and use that information as input for the model. The model can then generate an estimated amount of vertical angular offset. The model can observe other sensors or usage indicators as well; not just HMDs. That information (beyond just aging information) can all be fed as input into the mathematical model. Accordingly, various sensors, tools, or models can be used to determine the vertical angular image misalignment 425.

Figure 5:
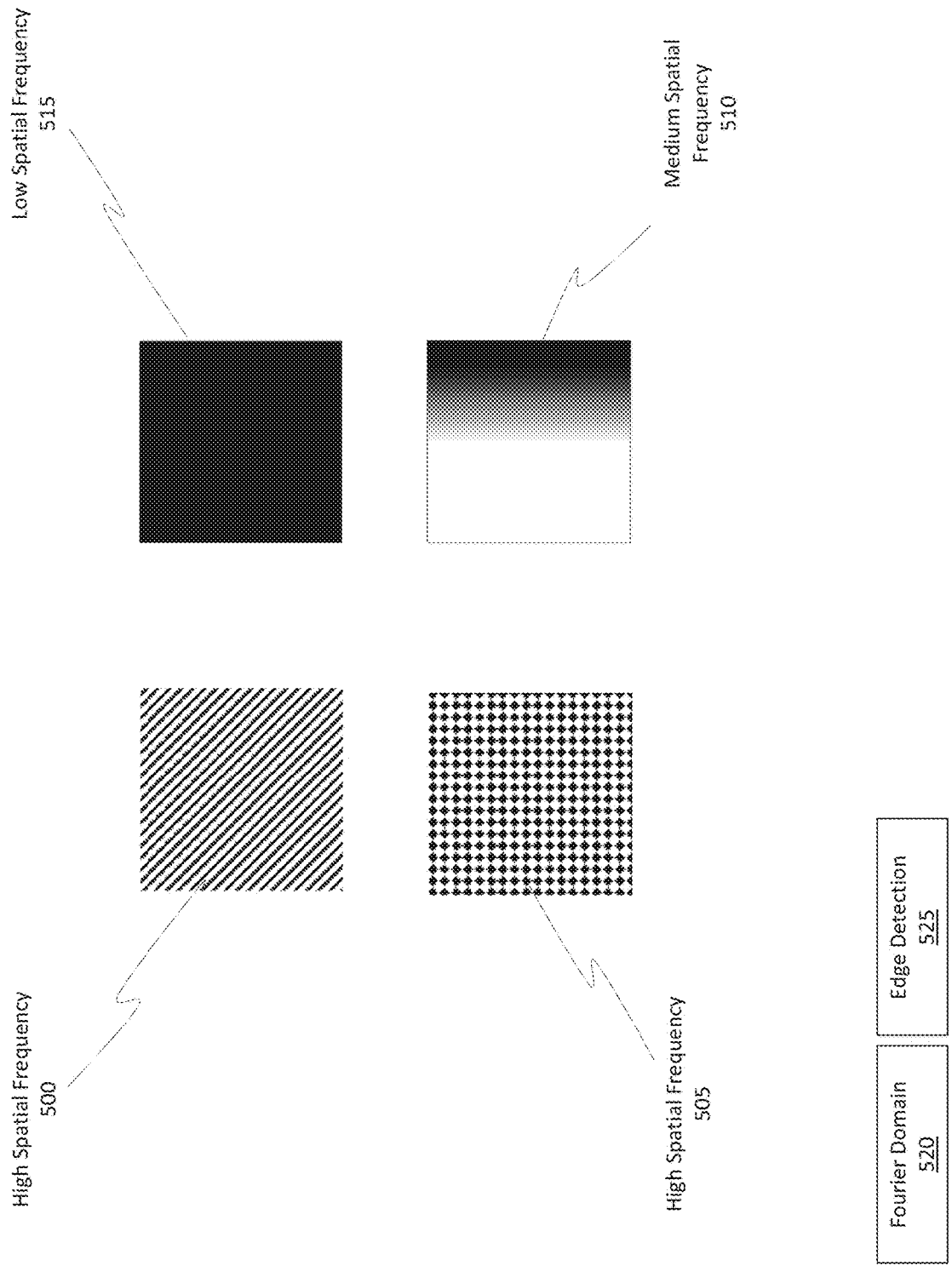
FIG. 5 illustrates examples of spatial frequency.

Returning to FIG. 1, service 105 is tasked with determining a spatial frequency 135 for the identified region 130. As used herein, the phrase "spatial frequency" generally refers to how much change in irradiance an object has. FIG. 5 is representative.

FIG. 5 shows four separate images. Two of the images have high irradiance characteristics (i.e. their pixel intensities vary significantly across the entire image), as shown by high spatial frequency 500 and 505. One image has a medium level of irradiance, as shown by medium spatial frequency 510. One image has a low level of irradiance, as shown by low spatial frequency 515.

There are various techniques for determining the spatial frequency of image content. Notably, it is typically the case that the spatial frequency is determined for a hologram displayed in the images. More generally, the spatial frequency is determined for a region in the display, where that region is a hologram or is virtualized content.

One way to determine the spatial frequency is by obtaining images of the HMD's displays, such as by using the cameras mentioned earlier. In some cases, instead of generating images from the cameras, the HMD's system on chip (SOC) can be used. For instance, the embodiments can read the images out of the SOC before sending them to the displays. Thus, images corresponding to the display can be obtained in multiple different ways. The resulting images are then transformed from the image dimension to a frequency dimension, such as the Fourier domain 520. Thus, a Fourier transform (e.g., perhaps a fast Fourier transform, or FFT) can be applied to the images. Various frequencies can then be identified in this domain. Those frequencies can then be mapped back to specific pixels in the image domain. Those pixels are then identified as corresponding to regions or holograms that have a high spatial frequency. Of course, different thresholds (e.g., such as threshold(s) 140 from FIG. 1) can be employed to determine what constitutes a "high" spatial frequency. Spatial frequencies that exceed the established threshold can thus be identified as being high.

By way of further information, the HMD's display can be thought of as a matrix of pixels that display an image. There are various ways to analyze the pixel values mathematically to determine the spatial frequency. One technique is by way of the Fourier transform. The embodiments are able to perform a dimensional Fourier transform on the pixel grid in the display space. The graphics processing unit (GPU) and/or the HMD's SOC (or any other processing unit) are able to perform this transform. As will be described in more detail later, the resulting information can then be mathematically used to reduce the high spatial frequency content by using a low pass filter.

Another way to determine, or rather infer/estimate, the spatial frequency is by performing edge detection 525. Edge detection 525 generally involves determining the pixel intensities for a group of neighboring pixels. If the difference between those intensities exceeds a threshold level, then an edge is likely present. These edges can be reflective of the spatial frequency of a hologram. If the number of edges in a hologram exceeds a threshold, then the hologram can be considered as having a high spatial frequency. Thus, performing edge detection is one technique for inferring the spatial frequency.

Another technique for determining the spatial frequency of a hologram is through the use of machine learning. A machine learning algorithm can be trained to recognize what constitutes high spatial frequency, medium spatial frequency, or low spatial frequency. Accordingly, a machine learning algorithm or model can also be used.

Returning to FIG. 1, service 105 determines that the vertical angular misalignment 120 is present in the stereoscopic images 115. Service 105 also determines the spatial frequency 135 of a region 130, or rather, of a hologram in the stereoscopic images 115. If the vertical angular misalignment 120 exceeds a vertical fusion threshold, which is included among the threshold(s) 140, service 105 identifies whichever hologram or region has the highest spatial frequency. Service 105 then triggers the execution of a correction algorithm 145, which is designed to modify the visual appearance of the region 130 or hologram in an effort to correct or compensate for the presence of the vertical angular misalignment 120. Often, the hologram with the highest spatial frequency is the one that is modified. In some scenarios, other holograms can also be modified, as will be described in more detail later.

Execution of the correction algorithm 145 includes reducing the spatial frequency of the region 130 until that spatial frequency is below a spatial frequency threshold, which is another threshold included among the threshold(s) 140. In some implementations, only the hologram having the highest spatial frequency is modified so its spatial frequency is not below the threshold. In some implementations, all of the holograms whose spatial frequencies are above the spatial frequency threshold are modified so that their spatial frequencies are all below the spatial frequency threshold. In yet some other implementations, the one or more holograms that are in the user's focal view (e.g., focal view 435 from FIG. 4) have their spatial frequencies modified so that they are below the spatial frequency threshold. FIGS. 6, 7, 8, and 9 are illustrative of these processes.

Figure 6:
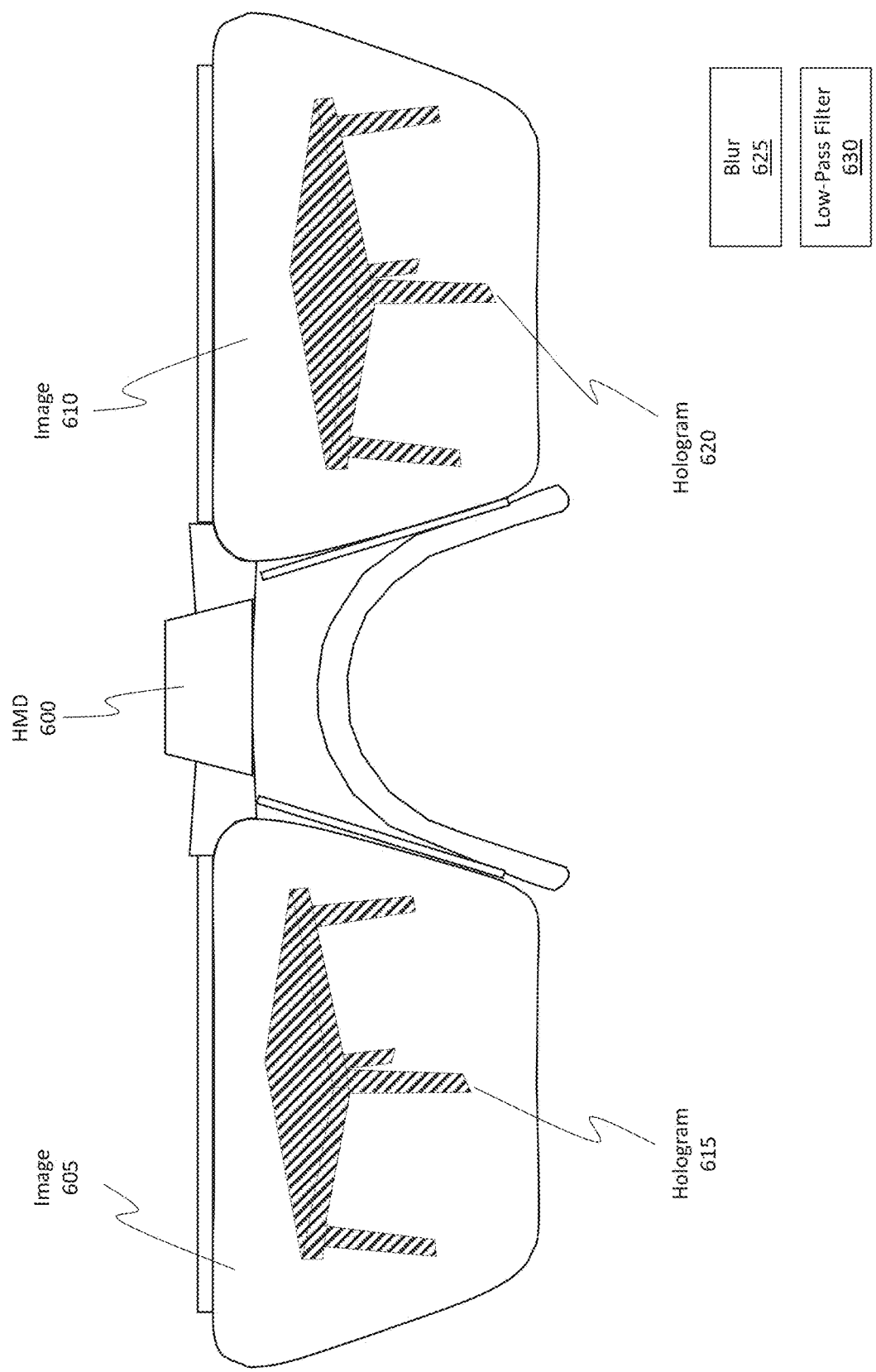
FIG. 6 illustrates the spatial frequency of a hologram.
Figure 7:
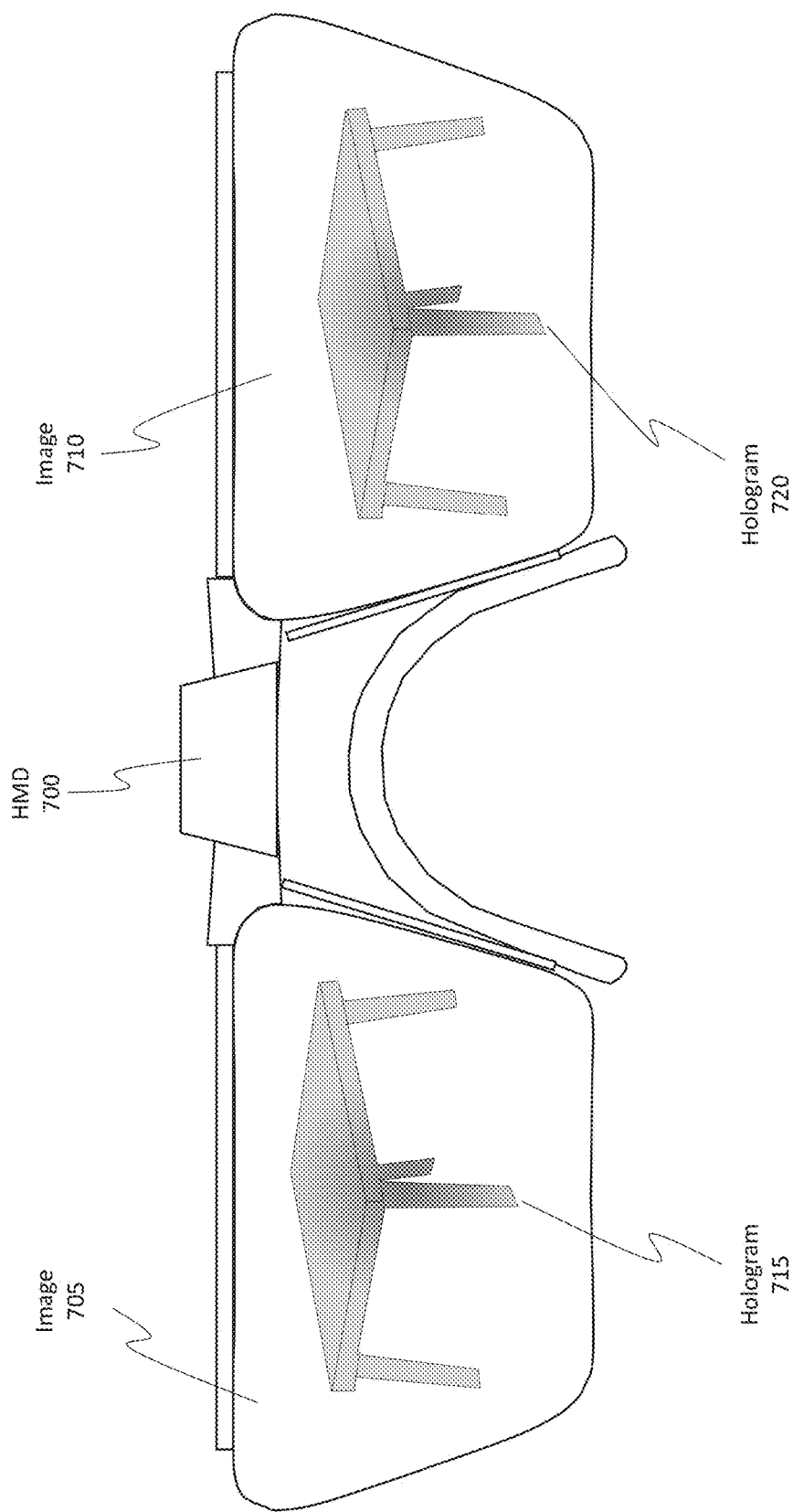
FIG. 7 illustrates a technique for reducing the spatial frequency of a hologram.

FIG. 6 illustrates an HMD 600 displaying an image 605 and an image 610. A hologram is displayed in both of those images, as shown by hologram 615 and hologram 620. The embodiments have determined that the amount of vertical angular offset (aka vertical angular image misalignment or vertical angular misalignment) exceeds the vertical fusion threshold. Consequently, the embodiments are tasked with attempting to correct that misalignment. To do so, the embodiments are configured to reduce the spatial frequency of the holograms displayed in the scene. As mentioned previously, it may be the case that all of the holograms are modified while in other cases one or some (but not all) of the holograms are modified. FIGS. 6 and 7 show an example scenario where a single hologram's spatial frequency is modified.

Initially, the hologram 615/620 (although rendered in different displays, these holograms correspond to one another) has a spatial frequency that exceeds a spatial frequency threshold. Consequently, the embodiments are configured to reduce this spatial frequency.

Various different techniques can be performed to reduce a hologram's spatial frequency. As one example, a blur 625 effect can be performed to blur (e.g., perhaps using a Gaussian blur) the colors or intensities of a hologram to reduce the spatial frequency. In some cases, the ML engine or algorithm mentioned earlier can be tasked with performing this blurring effect. In other cases, a low-pass filter 630 can be imposed on the stereoscopic images to reduce the spatial frequency. In another scenario, the border of the hologram can be identified, and then the internals of the hologram (i.e. those sections surrounded by the border) can all be made a single color or intensity. FIG. 7 is illustrative.

FIG. 7 shows the HMD 700, the image 705, and the image 710, which correspond to the similar components in FIG. 6. Whereas previously the hologram 615/620 in FIG. 6 had a high spatial frequency, hologram 715 and 720 now have a lower spatial frequency as a result of executing the correction algorithm. In this example scenario, the hologram 715/720 has been made to have a single, uniform color and intensity.

Figure 8:
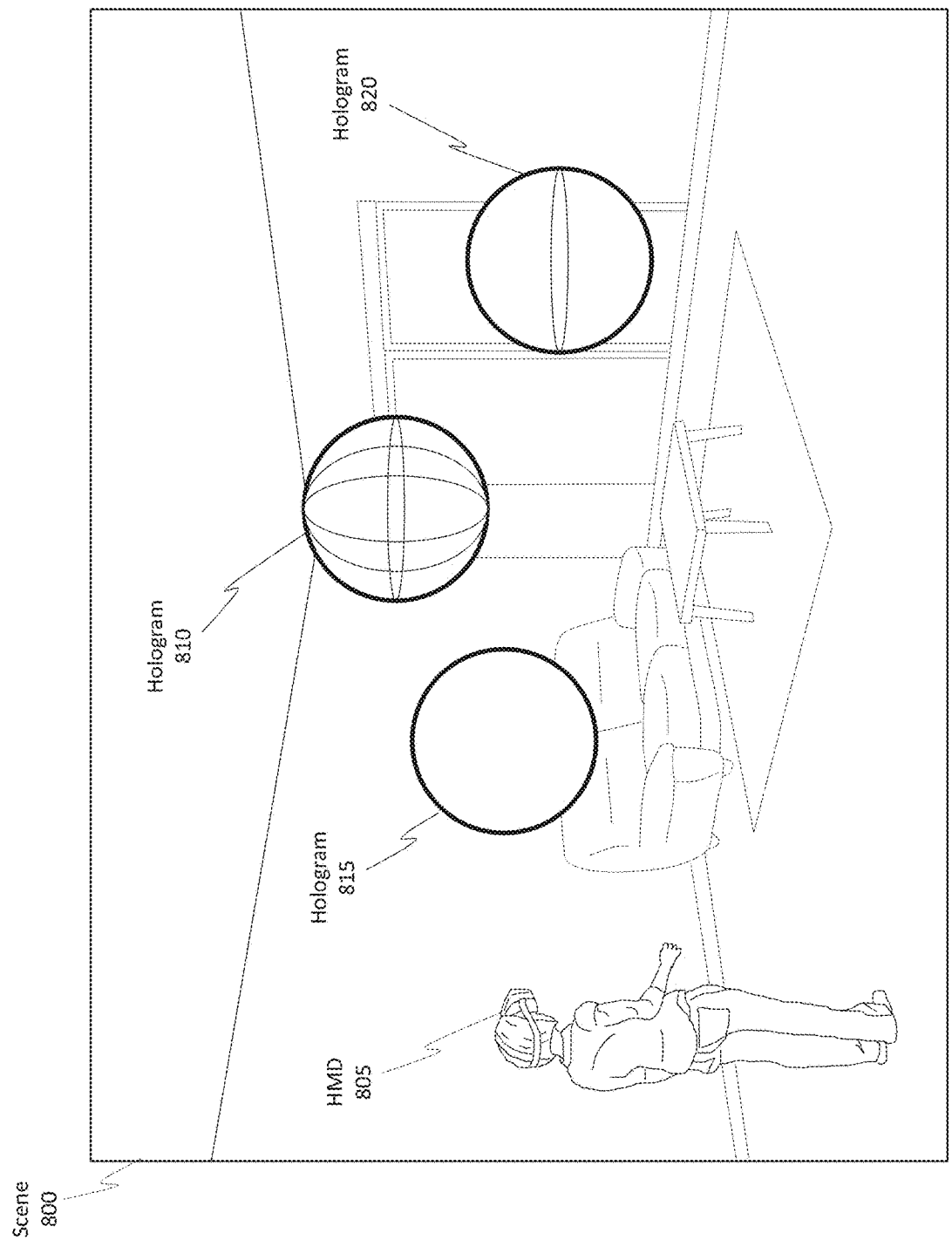
FIG. 8 illustrates multiple holograms in a scene.
Figure 9:
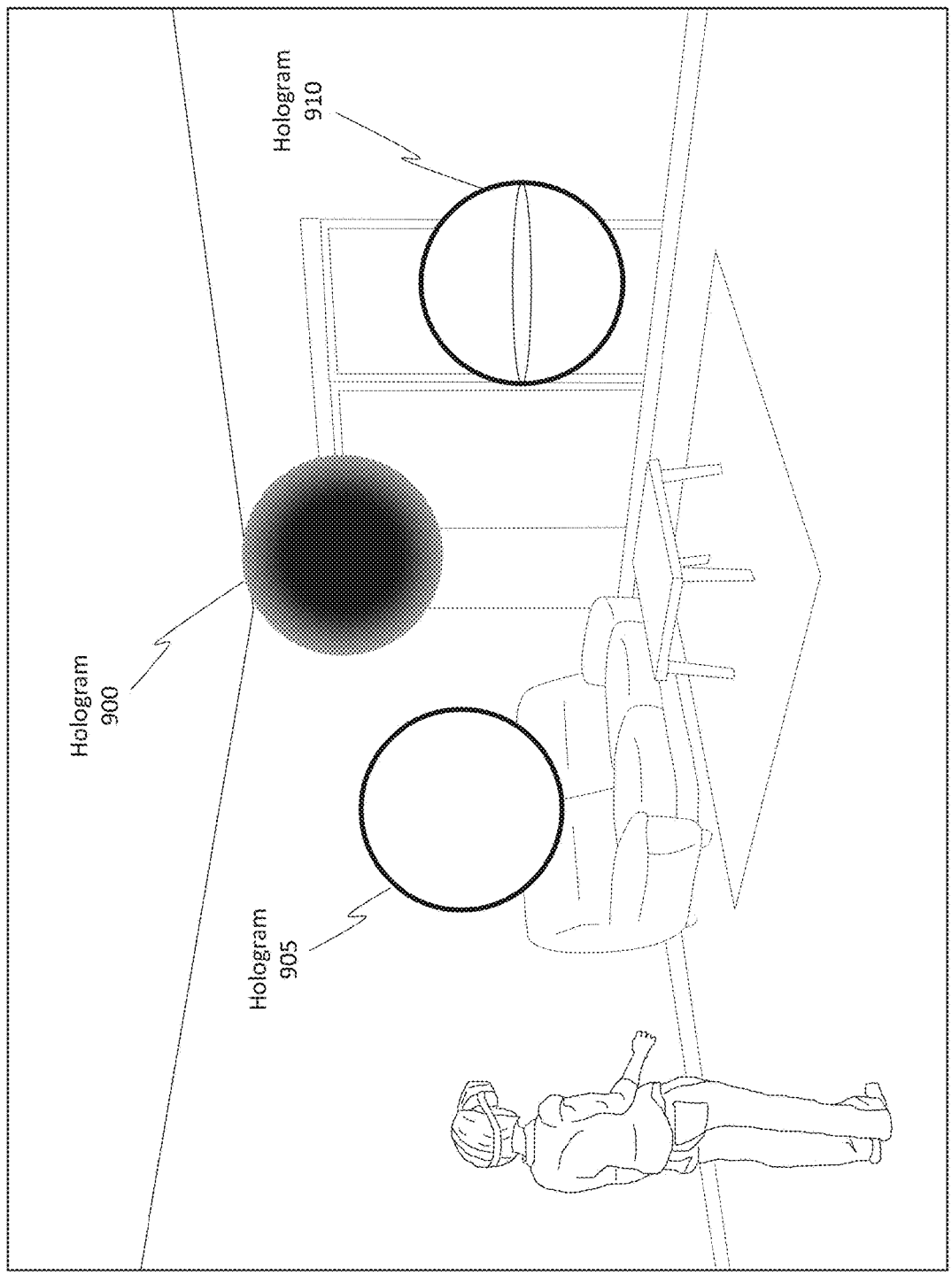
FIG. 9 illustrates another scenario where a hologram's spatial frequency is reduced.

FIGS. 8 and 9 show another example. FIG. 8 shows an example scene 800 in which a user is wearing an HMD 805. Scene 800 includes real-world content and multiple holograms, such as hologram 810, hologram 815, and hologram 820. Notice, the spatial frequencies are different for each of the holograms. Hologram 815 has the lowest spatial frequency, hologram 820 has a middle amount of spatial frequency, and hologram 810 has a high amount of spatial frequency.

Some embodiments are configured to identify all holograms whose spatial frequencies exceed the threshold. These embodiments then reduce the spatial frequencies of those identified holograms.

Some embodiments are configured to identify the hologram having the highest level of spatial frequency. The embodiments may then reduce only this one hologram's spatial frequency to be below the threshold.

Some embodiments reduce all holograms' spatial frequencies, even if one or more of those holograms have spatial frequencies that are already below the threshold. Some embodiments identify whichever holograms are in the user's focal view and then reduce the spatial frequencies of those holograms. Thus, different techniques can be employed.

FIG. 9 illustrates a scenario where only the hologram having the highest spatial frequency is modified. Notably, FIG. 9 shows a hologram 900, hologram 905, and hologram 910. Hologram 900 corresponds to hologram 810 in FIG. 8. Hologram 900 has been modified so its spatial frequency is now lower, and is particularly now less than the spatial frequency threshold. Notably, hologram 900 has been modified so it is now a single, uniform color and intensity. That may not always be the case, however. In some instances, the hologram is modified in a manner so that it still retains at least some of its color or intensity, but the overall spatial frequency of the hologram is reduced to be below the threshold.

In some cases, the embodiments factor in the age of the ER system. The embodiments may then use a model to determine by how much a hologram's spatial frequency is to be reduced based on the age of the unit. Thus, the amount of the blurring may be dependent on the age of the ER system. In other cases, the embodiments can determine how much vertical angular misalignment has occurred. The embodiments may then reduce a hologram's spatial frequency based on the amount of misalignment in a proportionate manner. The threshold mentioned above can thus be a dynamic threshold that may be dependent on age or on the amount of misalignment that is present. Accordingly, in some cases, the magnitude of the blurring effect may be increased as the suspected or estimated deformation or deviation (i.e. misalignment) is larger.

The model mentioned above can optionally be based on historical data that tracks a trend of progressive misalignment over time. The spatial frequency can then be reduced based on this model's tracked trends.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
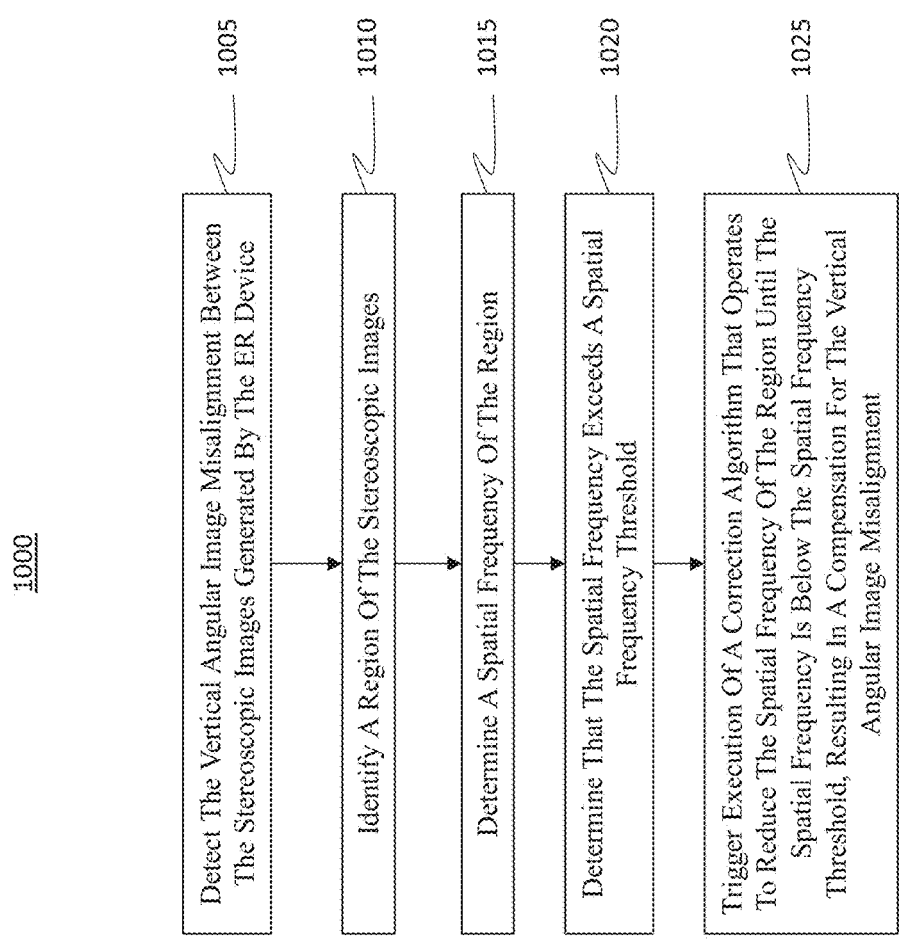
FIGS. 10, 11, and 12 illustrate flowcharts of example methods for correcting a vertical angular image misalignment.

Attention will now be directed to FIG. 10, which illustrates a flowchart of an example method 1000 for correcting a vertical angular image misalignment in stereoscopic images generated by an extended reality (ER) device. Method 1000 may be implemented by service 105 of FIG. 1. More generally, method 1000 may be implemented by the ER system 110 of FIG. 1.

Method 1000 includes an act (act 1005) of detecting the vertical angular image misalignment between the stereoscopic images generated by the ER device. The vertical angular image misalignment may occur for a variety of reasons. In any event, the misalignment occurs as a result of a vertical angular difference between the stereoscopic images exceeding a vertical fusion threshold, which is set to 0.3 milli-radians. In some cases, that threshold is set to $\frac{1}{50}^{th}$ of a degree.

Act 1010 includes identifying a region of the stereoscopic images. In one example, a focal view of a user wearing the ER device is directed to the region, and only the region is subjected to a correction algorithm that will later be performed.

Act 1015 includes determining a spatial frequency of the region. In one example, the process of determining the spatial frequency of the region is performed by transforming the stereoscopic images into a Fourier domain and by identifying frequencies that exceed a frequency threshold. Those frequencies are then mapped to pixels in the stereoscopic images. In another example, determining the spatial frequency of the region is performed via an edge detection algorithm in which the intensities of neighboring pixels in the stereoscopic images are determined.

Act 1020 includes determining that the spatial frequency exceeds a spatial frequency threshold. As mentioned previously, the threshold may be dynamic and may change based on different parameters or conditions.

Act 1025 includes triggering the execution of a correction algorithm that operates to reduce the spatial frequency of the region until the spatial frequency is below the spatial frequency threshold. Doing so results in a compensation for the vertical angular image misalignment. In some implementations, the process of reducing the spatial frequency of the region is performed by blurring the region. For example, reducing the spatial frequency of the region may be performed by applying a Gaussian blur to the region.

Reducing the spatial frequency of the region may also include applying a low-pass filter to the region. Reducing the spatial frequency of the region may also be performed by a machine learning (ML) model that modifies the stereoscopic images.

In some implementations, all regions of the scene whose spatial frequencies exceed the spatial frequency threshold are subjected to the correction algorithm. In some implementations, only a subset of the holograms in the scene have their spatial frequencies reduced.

Figure 11:
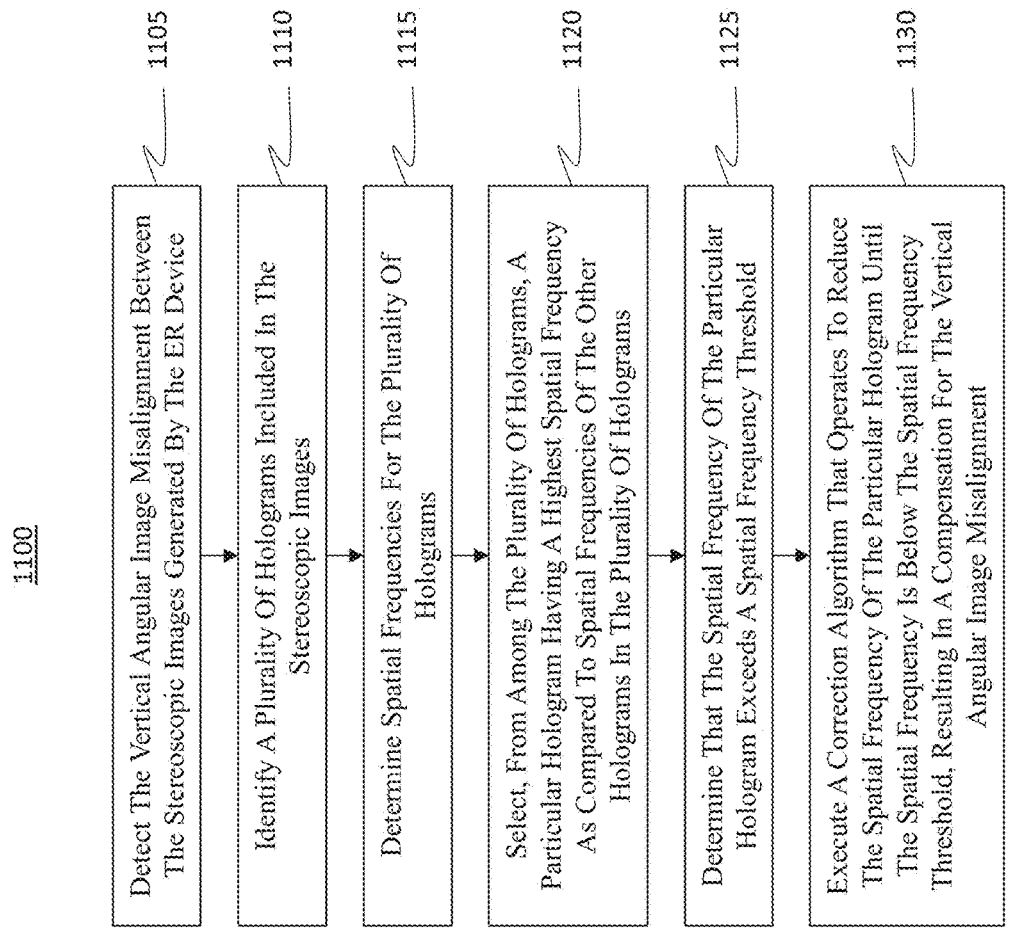

FIG. 11 illustrates another flowchart of an example method 1100 for correcting a vertical angular image misalignment in stereoscopic images generated by an ER system. Method 1100 may also be performed using architecture 100 of FIG. 1. In some cases, the method is performed by the ER system. That ER system can be any one of a virtual reality system, an augmented reality system, or a mixed reality system.

Method 1100 includes an act (act 1105) of detecting the vertical angular image misalignment between the stereoscopic images generated by the ER device. In one example, detecting the vertical angular image misalignment is performed using inertial measurement unit (IMU) data. In another example, detecting the vertical angular image misalignment is performed using data obtained from a strain gauge or other similar sensor. Image data can also be used to detect the misalignment.

Act 1110 includes identifying a plurality of holograms included in the stereoscopic images. In some cases, the number of holograms is 2, 3, 4, 5, 6, 7, 8, 9, 10, or more than 10.

Act 1115 includes determining spatial frequencies for the plurality of holograms. In some cases, the spatial frequencies for all of the holograms are determined. In some cases, only a select number of holograms have their spatial frequencies determined. For instance, the embodiments may refrain from determining the spatial frequencies for holograms located at the peripheral edge of the HMD's FOV. In some cases, the embodiments may elect to determine the spatial frequencies only for holograms that are generally located in the central area of focus of the HMD, with perhaps an additional buffer region to slightly further expand that region. In other cases, the embodiments may determine the user's gaze direction using eye-tracking units. The embodiments may then select holograms that are the area of focus of the user's eyes based on the eye tracking data.

Act 1120 includes selects, from among the plurality of holograms, a particular hologram having the highest spatial frequency as compared to spatial frequencies of the other holograms in the plurality of holograms. In some cases, the embodiments select additional holograms as well. For instance, a spatial frequency threshold may be defined. Any hologram whose spatial frequency exceeds that threshold may also be selected.

Act 1125 includes determining that the spatial frequency of the particular hologram exceeds a spatial frequency threshold. As mentioned above, the embodiments may identify other holograms whose spatial frequencies also exceed the spatial frequency threshold.

Act 1130 includes executing a correction algorithm that operates to reduce the spatial frequency of the particular hologram until the spatial frequency is below the spatial frequency threshold, resulting in a compensation for the vertical angular image misalignment. Optionally, those other holograms may also have their spatial frequencies reduced as well. For subsequent stereoscopic images that include this particular hologram, those images all display the hologram with the reduced spatial frequency.

As described previously, various techniques may be employed to reduce the spatial frequencies. For instance, blurring can be performed. A low-pass filter can also be used. A machine learning algorithm can also be used to reduce the spatial frequencies.

Figure 12:
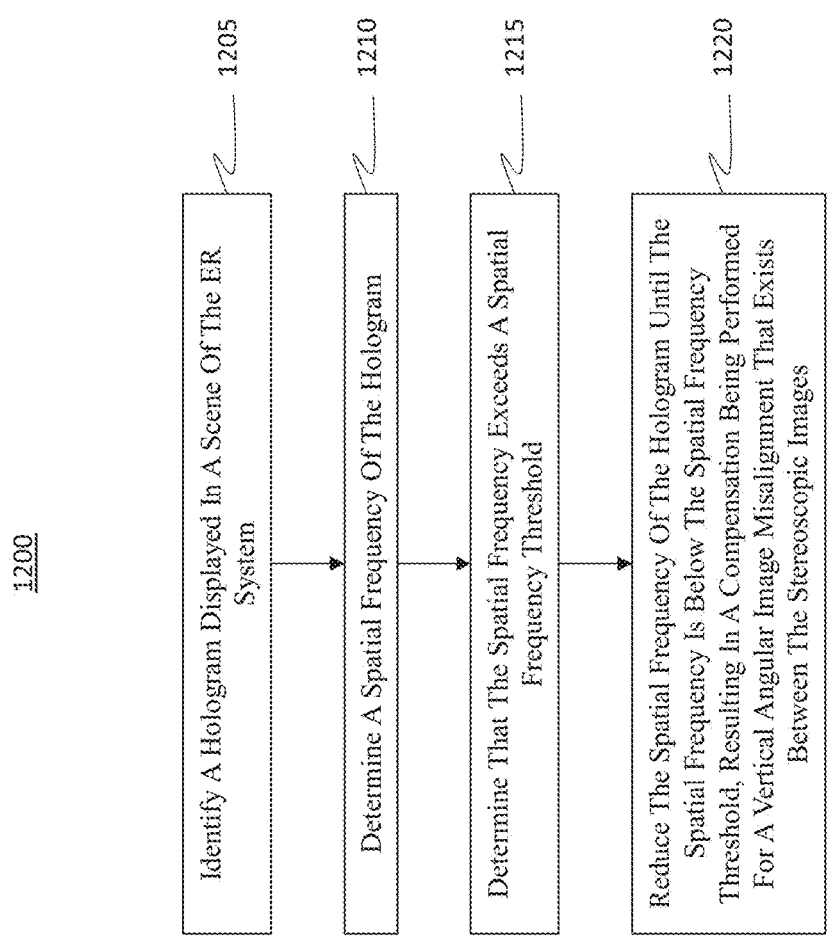

Attention will now be directed to FIG. 12, which illustrates a flowchart of an example method 1200 for correcting a vertical angular image misalignment in stereoscopic images generated by an extended reality (ER) device. Method 1200 can also be performed using service 105 and ER system 110 of FIG. 1.

Method 1200 includes an act (act 1205) of identifying a hologram displayed in a scene of the ER system.

Act 1210 includes determining a spatial frequency of the hologram. Any of the techniques mentioned earlier can be used for this act. Act 1215 includes determining that the spatial frequency exceeds a spatial frequency threshold.

Act 1220 includes reducing the spatial frequency of the hologram until the spatial frequency is below the spatial frequency threshold, resulting in a compensation being performed for a vertical angular image misalignment that exists between the stereoscopic images. Notably, an amount of the vertical angular image misalignment is determined to exceed a vertical fusion threshold. The process of reducing the spatial frequency is performed in response to determining that the vertical angular image misalignment exceeds the vertical fusion threshold. The vertical fusion threshold can be set to any value. One common threshold value is 0.3 milli-radians.

Using Real-World Content to Trigger a Correction Event

Up to this point, the embodiments have relied on the spatial frequency of a hologram to trigger a correction event to correct for vertical angular image misalignment. Other techniques are also available to trigger this correction, however. FIGS. 13, 14, 15, and 16 describe another technique for triggering the correction of vertical angular image misalignment.

Figure 13:
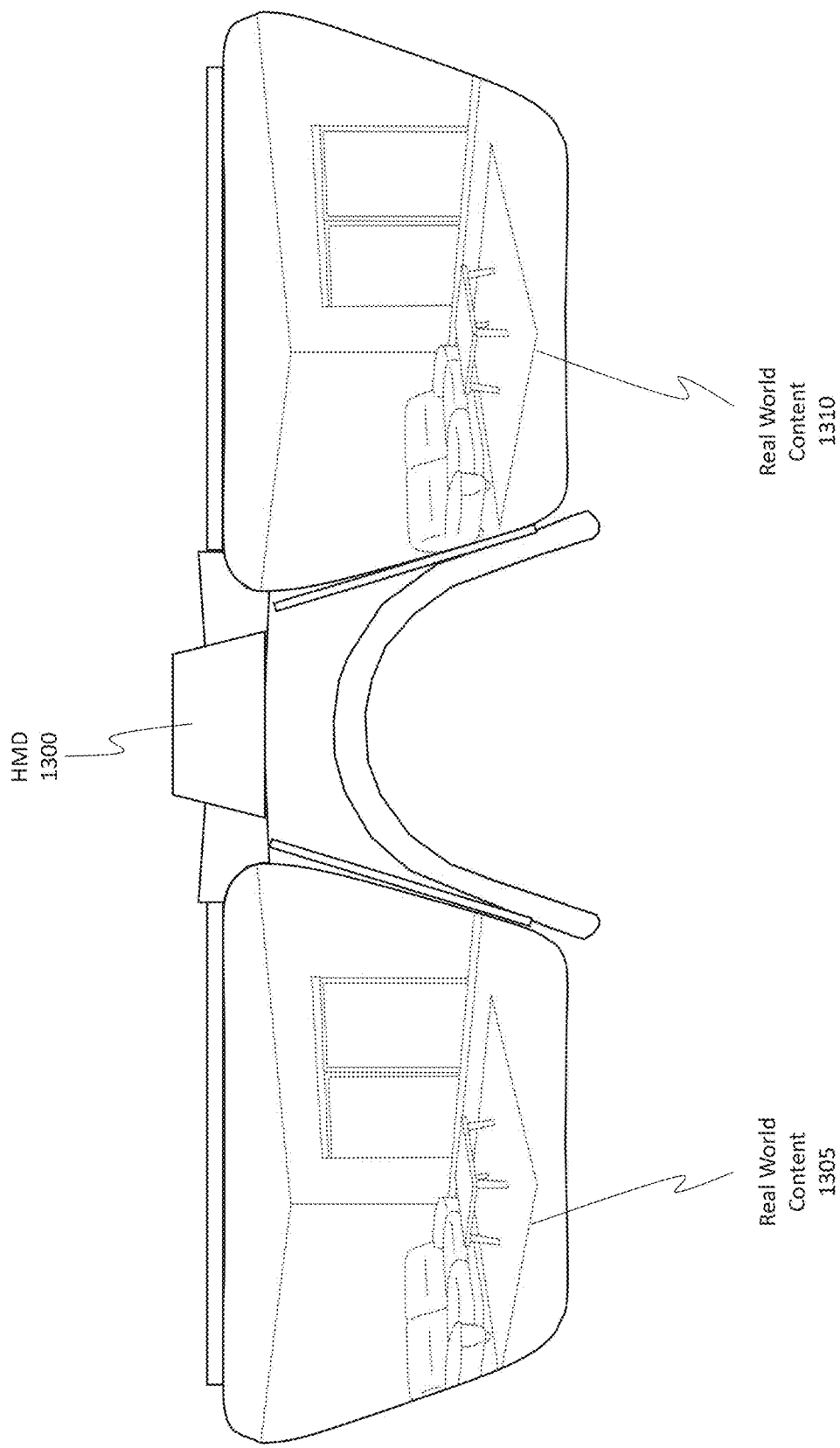
FIG. 13 illustrates an example of an HMD where real-world content is visible through the HMD's display.

FIG. 13 illustrates an HMD 1300, which is representative of ER system 110 of FIG. 1. In this example scenario, HMD 1300 is implemented as either an AR or MR system. That is, HMD 1300 includes a display through which a user will be able to see at least some of the real world. For example, notice in FIG. 13 how real-world content 1305 and 1310 is visible through the display of HMD 1300.

Figure 14:
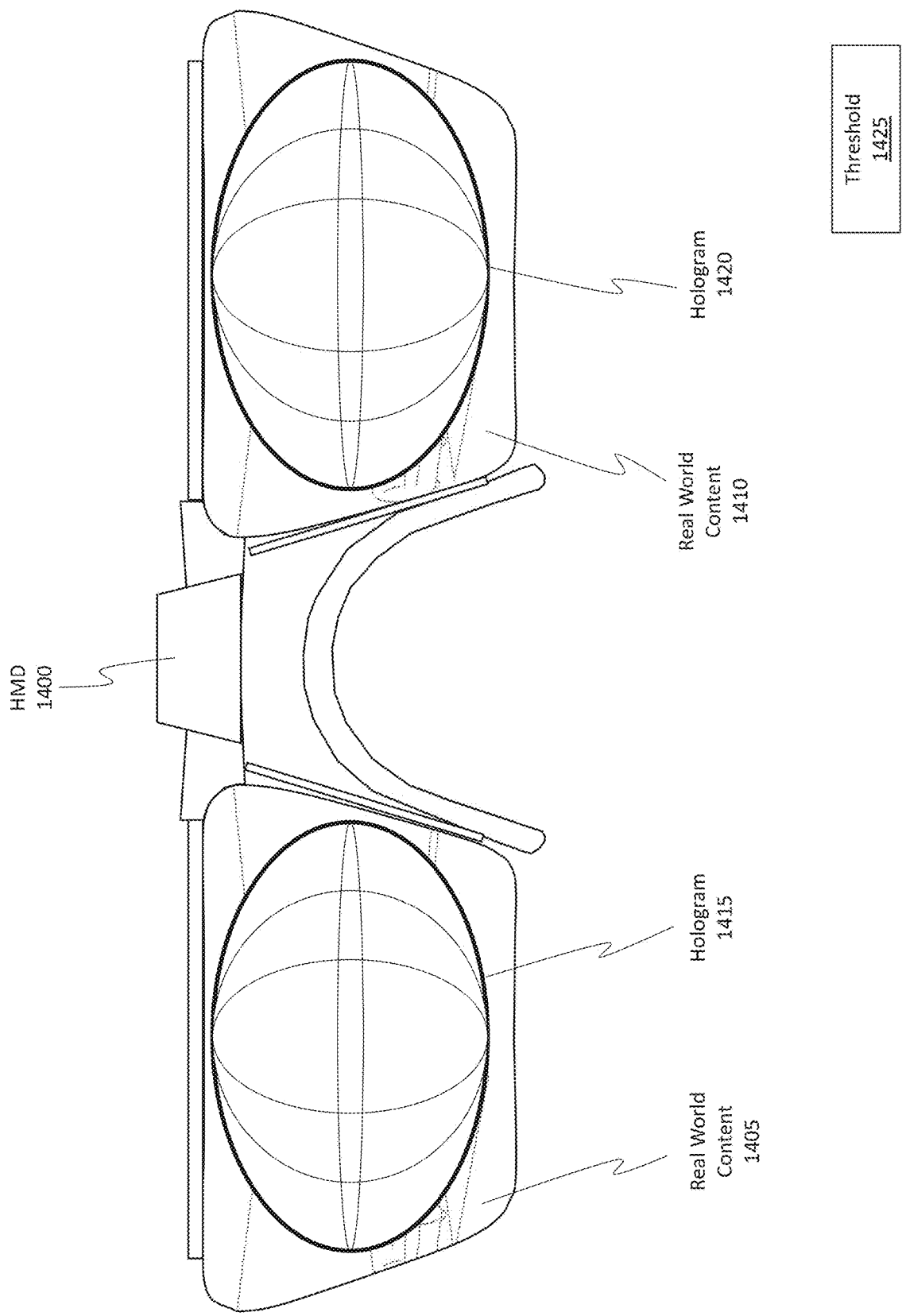
FIGS. 14 and 15 illustrate scenarios where real-world content and hologram content is visible in the HMD's display.

FIG. 14 shows an HMD 1400, which is representative of HMD 1300. Real-world content 1405 and 1410 is still visible through the displays. Notice, however, that HMD 1400 is now also displaying a hologram, as shown by holograms 1415 and 1420. In this example scenario, hologram 1415/1420 is occupying a large percentage of the FOV of HMD 1400. Of course, different-sized holograms can also be used.

That is, similar to the processes discussed earlier, the embodiments are able to determine whether a vertical angular image misalignment has occurred. The embodiments are also able to determine the level, amount, or extent of the vertical angular image misalignment. If the amount of misalignment exceeds a threshold 1425, then the embodiments are tasked with performing a correction operation to attempt to correct for the vertical angular image misalignment.

Previously, the embodiments relied on the amount of a hologram's spatial frequency to determine when, how, and to what extent the correction should be applied. In the embodiments shown in FIGS. 13, 14, 15, and 16, the embodiments rely on the amount of real world content that is visible on the HMD's display screen.

Some embodiments include display-facing cameras. One camera is directed to the lefthand display of the HMD, and the other camera is directed to the righthand display of the HMD. These cameras generate images of those displays. The resulting images will include content representative of the real world and content representative of the displayed holograms.

The embodiments are able to analyze these images to detect how much of the real world is visible in those images. If the amount of visible real world content (in those images) exceeds the threshold 1425, then the embodiments will trigger a correction event to correct for the vertical angular image misalignment.

That threshold 1425 can be set to any value or metric. For instance, the threshold 1425 may be based on a percentage of the image or FOV that the real-world content occupies. As examples only, the percentage threshold value may be set to any value between 1% and 99%. As a specific example, suppose the threshold was set to 50%. If the real world content occupied 50% of the image or FOV, then the embodiments will trigger the correction event.

In some cases, the threshold 1425 may be based on the number of pixels in the image that are used to represent the real world content. Any pixel number may be used, as was the case with the percentage value. As just one example, suppose each resulting image was a 4 k image (e.g., 2,160 pixels tall by 3,840 pixels wide). The number of pixels in that image would then be 8,294,400. If the threshold was set to 4,000,000 pixels, then 4,000,000 pixels in the image would need to be representative of the real-world content in order for the correction event to be triggered. Of course, these are just example values, and other values can be used.

In this manner, the embodiments are able to selectively prioritize correcting larger amounts of vertical image misalignments based on the amount of real-world visibility. When the real world is visible (with no dimming of the real world), the user will be verging not only on the virtual content, but also on the real world. In this case, the human visual system is very sensitive to small vertical misalignments, and the experience will lead to diplopic imagery if not corrected. Thus, correcting even small amounts of misalignment for when the real world is visible is paramount to quality and comfortable user experience.

When the real world is not visible, in the case of VR (by its very nature) or AR/MR with dimmed real-world backgrounds, the ability of the visual system to fuse vertically offset images is more flexible, as the user is verging on a content locked to the virtual display. As such, the correction of small misalignments that would normally result in diplopia if the real world were fully visible, is not necessary and might be counter-productive to the user experience since corrections can be observed and disruptive. Thus, the application of the vertical misalignment correction based on the vertical fusional thresholds can be performed with regard to real-world visibility and/or with regard to the spatial frequency of a stimulus. The embodiments are able to select a threshold to determine how much of the real world should be visible in order to trigger the correction operation.

With respect to FIG. 14, the hologram 1415/1420 occupies a large amount of the HMD's FOV. As a result, the amount of real world content that is visible is quite small. In this example scenario, it may be the case that the amount of visible real world content is below the threshold 1425. As a consequence, the embodiments may refrain from triggering the correction event.

Figure 15:
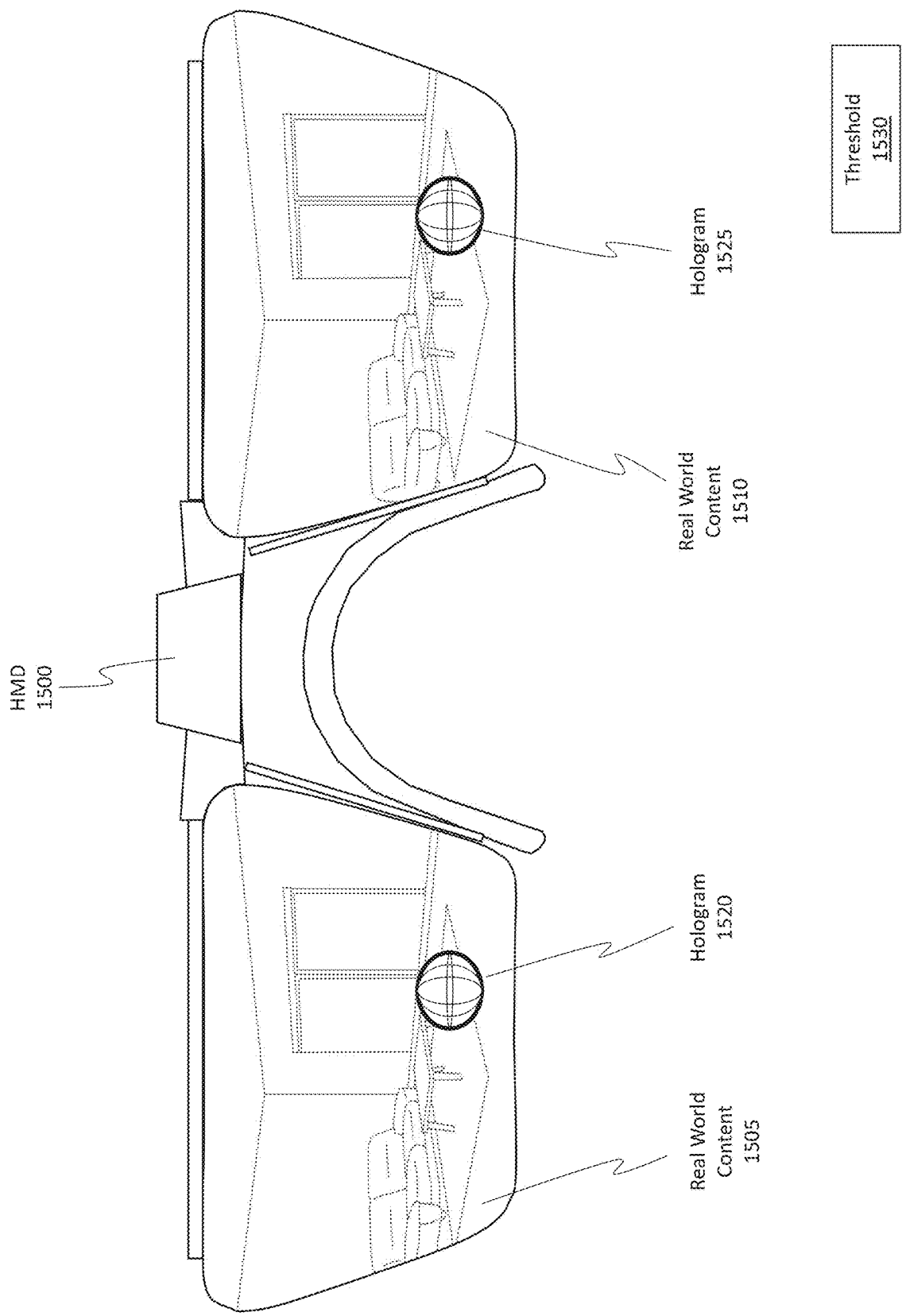

On the other hand, FIG. 15 shows a different scenario. FIG. 15 shows an HMD 1500 with displays. A user viewing these displays is able to see real world content 1505/1510 and a hologram 1520/1525. Notice, the size of the hologram 1520/1525 is much smaller. The result of having a smaller hologram is that more of the real world content is visible through the displays. Similarly, more of the real world content will be represented in the images of those displays. In this example scenario, then, the amount of real world content that is visible exceeds the threshold 1530, and the embodiments will be triggered to execute the correction algorithm.

In some cases, the correction algorithm still involves modifying the spatial frequencies of the holograms to reduce their spatial frequencies. Whereas previously the spatial frequency was used as a triggering factor for determining when to execute the correction, in some embodiments, the amount of visible real world content is the triggering factor. The process for correcting the misalignment can be similar as before, however, such as by reducing the holograms' spatial frequencies. Another correction mechanism involves user input to help calibrate the displays of the HMD. For instance, the user can be involved in repositioning the displayed holograms until they are at positions that are comfortable for the user. Accordingly, there are various correction techniques that can be employed to correct vertical angular image misalignment.

Figure 16:
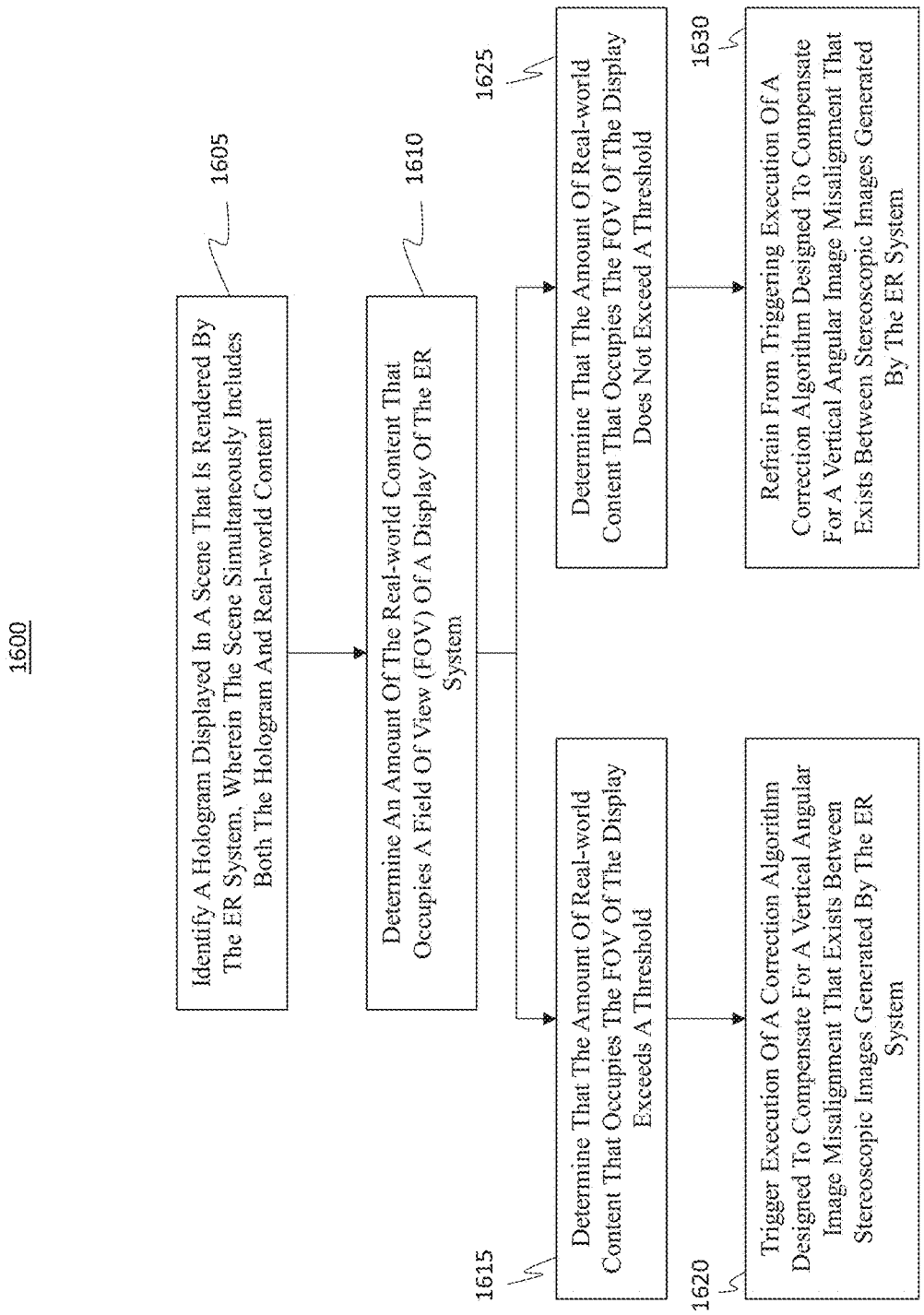
FIG. 16 illustrates a flowchart of an example method for correcting a vertical angular image misalignment.

Attention will now be directed to FIG. 16, which illustrates a flowchart of an example method 1600 for correcting a vertical angular image misalignment in stereoscopic images generated by an extended reality (ER) device. Method 1600 can also be implemented by ER system 110 of FIG. 1 and the service 105.

Method 1600 includes an act (act 1605) of identifying a hologram displayed in a scene that is rendered by the ER system. The scene simultaneously includes both the hologram and real-world content.

Act 1610 includes determining the amount of real-world content that occupies a field of view (FOV) of a display of the ER system. This process may be performed using cameras that are aimed at the HMD's displays. One camera generates an image of the lefthand display of the HMD, and another camera generates an image of the righthand display of the HMD. The embodiments are able to analyze the resulting images from these cameras to detect what content corresponds to real world content and what content corresponds to holograms. Regarding this analysis, the embodiments are able to determine where, in the display, the ER system displayed the holograms. That information can then be used to map or identify corresponding pixel locations in the resulting images. In some implementations, machine learning can be used to analyze the images to distinguish between real-world content and holograms.

Method 1600 then includes a branch in which different operations may be performed. Act 1615 includes determining that the amount of real-world content that occupies the FOV of the display exceeds a threshold. As mentioned previously, various techniques may be used to determine how much real world content is visible.

In response to the determination that the amount of real-world content that occupies the FOV of the display exceeds the threshold, act 1620 includes triggering the execution of a correction algorithm designed to compensate for a vertical angular image misalignment that exists between stereoscopic images generated by the ER system.

On the other hand, act 1625 includes determining that the amount of real-world content that occupies the FOV of the display does not exceed a threshold.

In response to the determination that the amount of real-world content that occupies the FOV of the display does not exceed the threshold, act 1630 includes refraining from triggering the execution of a correction algorithm designed to compensate for a vertical angular image misalignment that exists between stereoscopic images generated by the ER system. Accordingly, the embodiments are able to trigger the correction event based on the amount of real world content that is visible through the HMD's displays.

Example Computer/Computer Systems

Figure 17:
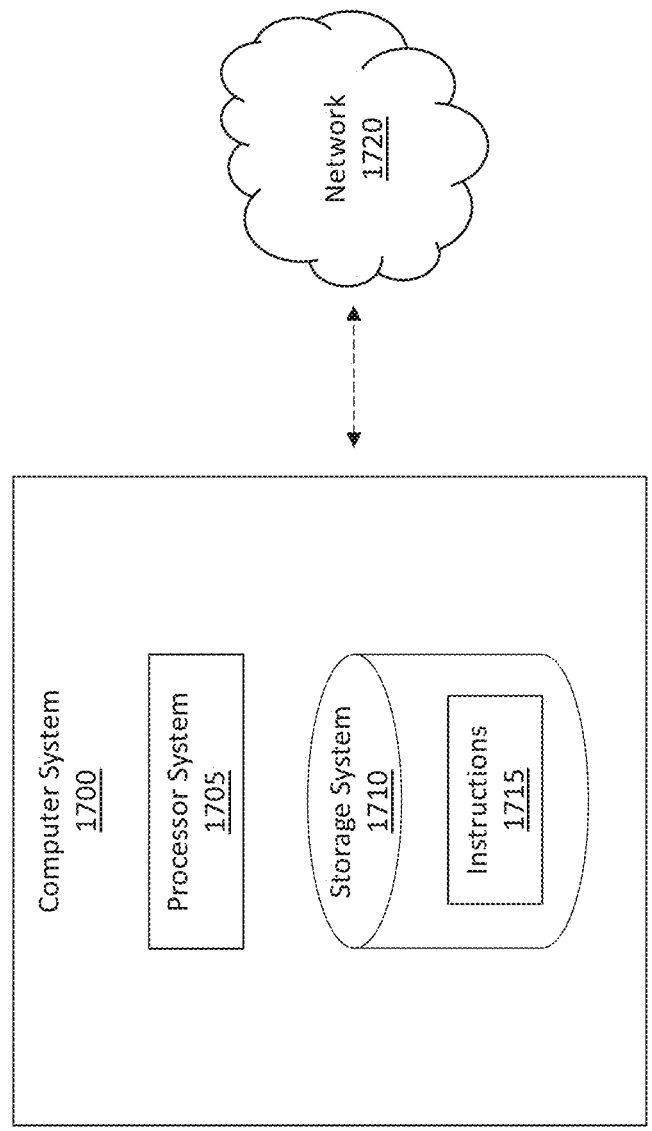
FIG. 17 illustrates an example computer system that can be configured to perform any of the disclosed operations.

Attention will now be directed to FIG. 17 which illustrates an example computer system 1700 that may include and/or be used to perform any of the operations described herein. Computer system 1700 may take various different forms, such as the ER system 110 of FIG. 1. For example, computer system 1700 may be embodied as a tablet, a desktop, a laptop, a mobile device, or a standalone device, such as those described throughout this disclosure. Computer system 1700 may also be a distributed system that includes one or more connected computing components/devices that are in communication with computer system 1700.

In its most basic configuration, computer system 1700 includes various different components. FIG. 17 shows that computer system 1700 includes a processor system that includes one or more processor(s) (aka a "hardware processing unit") and a storage system 1710.

Regarding the processor(s) of the processor system 1705, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1700. The different components, modules, engines, and services described herein may be implemented as objects or processors that execute on computer system 1700 (e.g. as separate threads).

Storage system 1710 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage system 1710 is shown as including executable instructions 1715. The executable instructions 1715 represent instructions that are executable by the processor(s) of the processor system 1705 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1720. For example, computer system 1700 can communicate with any number devices or cloud services to obtain or process data. In some cases, network 1720 may itself be a cloud network. Furthermore, computer system 1700 may also be connected through one or more wired or wireless networks to remote/separate computer systems(s) that are configured to perform any of the processing described with regard to computer system 1700.

A "network," like network 1720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for correcting a vertical angular image misalignment in stereoscopic images generated by an extended reality (ER) system, said method comprising:
   detecting the vertical angular image misalignment between the stereoscopic images generated by the ER system, which is operating in a scene;
   identifying a region of the stereoscopic images;
   determining a spatial frequency of the region;
   determining that the spatial frequency exceeds a spatial frequency threshold; and
   triggering execution of a correction algorithm that operates to reduce the spatial frequency of the region until the spatial frequency is below the spatial frequency threshold, resulting in a compensation for the vertical angular image misalignment.

2. The method of claim 1, wherein reducing the spatial frequency of the region is performed by blurring the region.

3. The method of claim 1, wherein the vertical angular image misalignment occurs as a result of a vertical angular difference between the stereoscopic images exceeding a vertical fusion threshold, which is set to 0.3 milli-radians.

4. The method of claim 1, wherein the vertical angular image misalignment occurs as a result of a vertical angular difference between the stereoscopic images exceeding a vertical fusion threshold, which is set to $\frac{1}{50}^{th}$ of a degree.

5. The method of claim 1, wherein reducing the spatial frequency of the region includes applying a low-pass filter to the region.

6. The method of claim 1, wherein reducing the spatial frequency of the region is performed by a machine learning (ML) model that modifies the stereoscopic images.

7. The method of claim 1, wherein reducing the spatial frequency of the region is performed by applying a gaussian blur to the region.

8. The method of claim 1, wherein determining the spatial frequency of the region is performed by transforming the stereoscopic images into a Fourier domain, identifying frequencies that exceed a frequency threshold, and mapping those frequencies to pixels in the stereoscopic images.

9. The method of claim 1, wherein determining the spatial frequency of the region is performed via an edge detection algorithm in which intensities of neighboring pixels in the stereoscopic images are determined.

10. The method of claim 1, wherein a focal view of a user wearing the ER system is directed to the region, and wherein only the region is subjected to the correction algorithm.

11. The method of claim 1, wherein all regions of the scene whose spatial frequencies exceed the spatial frequency threshold are subjected to the correction algorithm.

12. An extended reality (ER) system that corrects a vertical angular image misalignment in stereoscopic images generated by the ER system, said ER system comprising:
  a processor system; and
  a storage system that stores instructions that are executable by the processor system to cause the ER system to:
    detect the vertical angular image misalignment between the stereoscopic images generated by the ER system, which is operating in a scene;
    identify a plurality of holograms included in the stereoscopic images;
    determine spatial frequencies for the plurality of holograms;
    select, from among the plurality of holograms, a particular hologram having a highest spatial frequency as compared to spatial frequencies of the other holograms in the plurality of holograms;
    determine that the spatial frequency of the particular hologram exceeds a spatial frequency threshold; and
    execute a correction algorithm that operates to reduce the spatial frequency of the particular hologram until the spatial frequency is below the spatial frequency threshold, resulting in a compensation for the vertical angular image misalignment.

13. The ER system of claim 12, wherein detecting the vertical angular image misalignment is performed using inertial measurement unit (IMU) data.

14. The ER system of claim 12, wherein detecting the vertical angular image misalignment is performed using strain gauge data.

15. The ER system of claim 12, wherein detecting the vertical angular image misalignment is performed using image data.

16. The ER system of claim 12, wherein the ER system is a virtual reality system.

17. The ER system of claim 12, wherein the ER system is one of an augmented reality system or a mixed reality system.

18. A method for correcting a vertical angular image misalignment in stereoscopic images generated by an extended reality (ER) system, said method comprising:
  identifying a hologram displayed in a scene of the ER system;
  determining a spatial frequency of the hologram;
  determining that the spatial frequency exceeds a spatial frequency threshold; and
  reducing the spatial frequency of the hologram until the spatial frequency is below the spatial frequency threshold, resulting in a compensation being performed for a vertical angular image misalignment that exists between the stereoscopic images.

19. The method of claim 18, wherein an amount of the vertical angular image misalignment is determined to exceed a vertical fusion threshold, and wherein reducing the spatial frequency is performed in response to determining that the vertical angular image misalignment exceeds the vertical fusion threshold.

20. The method of claim 19, wherein the vertical fusion threshold is 0.3 milli-radians.

* * * * *